United States Patent [19]

Le Goff

[11] Patent Number: 4,606,404

[45] Date of Patent: Aug. 19, 1986

[54] METHOD AND APPARATUS FOR RECYCLING THERMAL ENERGY

[75] Inventor: Pierre Y. J. Le Goff, Vandoeuvre, France

[73] Assignee: Centre National de la Recherche Scientifique, France

[21] Appl. No.: 658,843

[22] Filed: Nov. 29, 1984

Related U.S. Application Data

[62] Division of Ser. No. 291,145, Aug. 7, 1981, Pat. No. 4,527,621.

[30] Foreign Application Priority Data

Aug. 11, 1980 [FR] France .................. 80 17676
Jul. 16, 1981 [FR] France .................. 81 13846

[51] Int. Cl.$^4$ .................. F23D 21/00; F25D 15/00
[52] U.S. Cl. .................. 165/104.12; 62/101; 62/335; 62/476
[58] Field of Search .................. 165/104.12; 62/101, 62/335, 476

[56] References Cited

U.S. PATENT DOCUMENTS

| 1,913,468 | 6/1933 | Altenbirch | 165/104.12 |
| 3,306,346 | 2/1967 | Othmer | 62/335 |

FOREIGN PATENT DOCUMENTS

| 840283 | 1/1939 | France . | |
| 1056314 | 10/1953 | France . | |
| 2180526 | 11/1973 | France . | |
| 372339 | 5/1932 | United Kingdom . | |

OTHER PUBLICATIONS

Brown, F., *Energy Storage Provided by Heat Pump*, Electrical Review, vol. 202, No. 14, 4/1978, pp. 27–28.

*Primary Examiner*—Albert W. Davis, Jr.
*Attorney, Agent, or Firm*—Pollock, VandeSande & Priddy

[57] ABSTRACT

The invention refers to a process and devices for the reutilization of low-level thermal energy. According to the invention, devices are utilized forming an evaporator-mixer, advantageously connected to devices forming an evaporator-separator in order to supply from a low-level heat source, for example at 25° C., higher-level heat, for example at 80° C., by making use of the phenomena of evaporation and mixing of two fluids in vapor-pressure equilibrium at different temperatures. The invention also allows and applies in particular to the utilization of the noble thermal energy consumed in a high-temperature boiler. To this end, the heat given off in the boiler is first used to assure in evaporator-separators the formation or reconstitution of concentrated solutions from diluted solutions, and these concentrated solutions are utilized according to the needs of demand to extract by means of evaporator-mixers heat coming from a low-level source.

5 Claims, 23 Drawing Figures

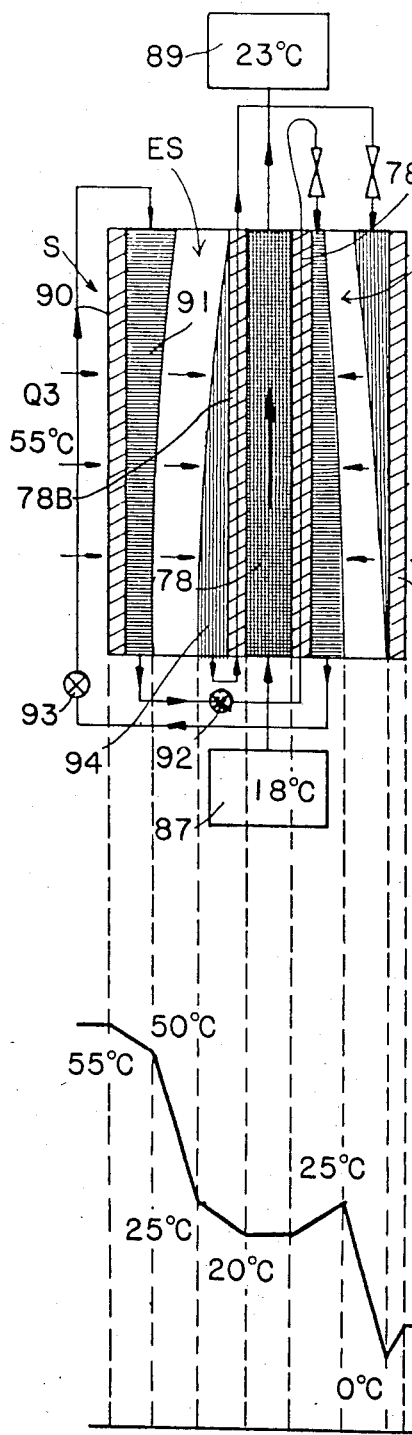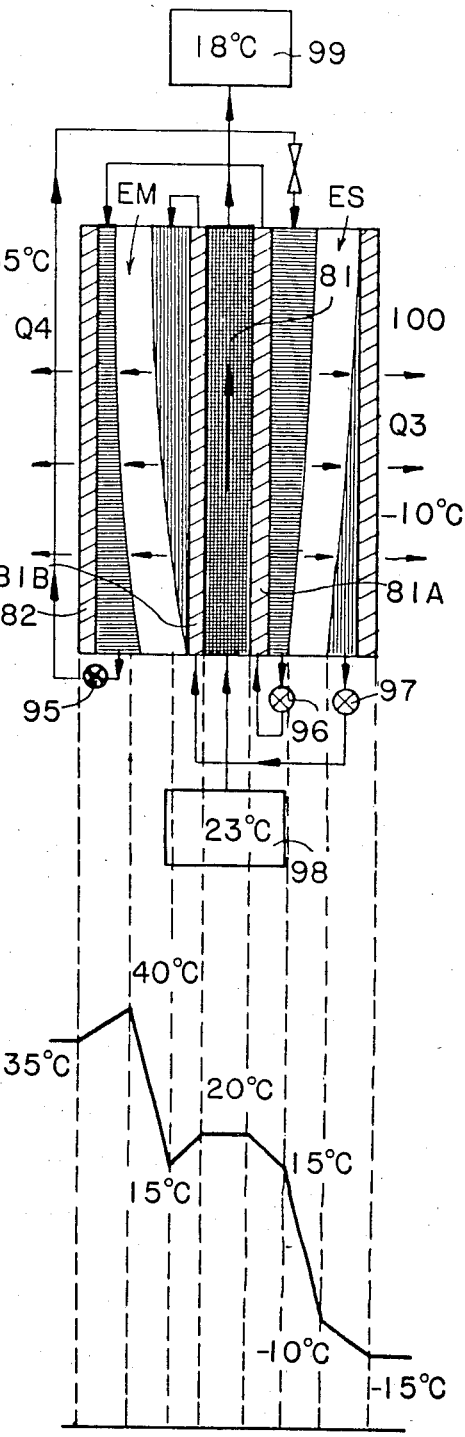

METHOD AND APPARATUS FOR RECYCLING THERMAL ENERGY

This is a division of application Ser. No. 291,145, filed Aug. 7, 1981 now U.S. Pat. No. 4,527,621, granted July 9, 1985.

FIELD OF THE INVENTION

The present invention concerns a process and systems permitting the reutilization and storage of low-level thermal energy, making use of the phenomena of evaporation and mixing of two fluids in vapor-pressure equilibrium at different temperatures.

BRIEF DESCRIPTION OF THE PRIOR ART

It is known that two fluids of different natures can be in vapor-pressure equilibrium at different temperatures. Thus, for example, a balloon flask containing pure water and a balloon containing a solution in water of a salt such as lithium chloride, calcium chloride, or a substance such as soda, sulfuric acid, or ammonia are only in vapor equilibrium at different temperatures. Thus, for example, the pressure of pure water vapor at 20° C. is essentially equal to that of a calcium chloride brine at 50° C. and that of a lithium chloride saturated solution at 70°–80° C. or a solution of sulfuric acid, soda or zinc chloride towards 120° C.

It is possible to take advantage of this phenomenon to "boil" at low temperature a liquid such as water, which we shall call "solvent," by using as condenser a volume in which a mixture formed by dissolving in the solvent another body, which we shall call "aqueous solution," having the property of bringing down the solvent's vapor pressure, is kept at a higher temperature. The vapor may be worked in a turbine. It is also possible to take advantage of the difference in temperatures of the solutions for which there is vapor equilibrium to transfer calories brought into the liquid solvent at low level and recover them at a higher level, i.e., at a higher temperature, in the solution obtained by mixing, the necessary "noble" energy being provided by the increase in entropy in the system when the solvent is mixed with the concentrated aqueous solution to form a diluted solution. For purposes of abbreviation, the concentrated solution will be called "brine" and the diluted solution resulting from the mixing of the concentrated solution and the solvent will be called "diluate." The concentrated solution may even be pure aqueous solution.

In order for the system to function continuously, it is necessary to constantly provide it with or regenerate the solvent (water, for example) and the aqueous solution (salt or another substance: calcium chloride, for example) necessary for the operation.

In short, this is a "heat pump" of a new type: the noble energy necessary to the operation of the pump is supplied by the effect of dilution of a certain amount of aqueous solution in the solvent.

BRIEF DESCRIPTION OF THE INVENTION

The invention proposes new and original systems and processes allowing in particular an effective and very economical reutilization of low-level thermal energy especially well adapted to heating buildings.

The invention also allows a particularly elegant and effective reutilization of low-level thermal discharges of all types, such as thermal discharges from nuclear or other power plants, thermal discharges from factories, waste water, etc. The invention likewise allows the utilization and long-term storage of diluted and intermittent energy such as solar energy and cold-wind energy.

The invention likewise makes it possible to use the "environmental" energy of water masses such as rivers, lakes and seas, and waters of geothermal origin.

According to an essential characteristic of the invention, an evaporator-mixer system for the reutilization of low-level thermal energy of the type making use of the transfer of energy from a first source at a given temperature, called the "cold source," to a second source at a higher temperature, called "hot source," by evaporation of a liquid solvent brought to the temperature of the cold source and condensation of the solvent vapor in a second liquid which is mixed (diluate) with another fluid (brine) at the temperature of the hot source, is characterized by the fact that it includes:

at least one evaporation surface, such as a plate or analogous feature in contact by its outer face with the calorie-bearing fluid of the low-level energy source at a temperature between that of the hot source and that of the cold source, and on the inner face of which said liquid solvent is carried and circulates or streams essentially at the temperature of the cold source, said inner face of the plate forming an evaporation surface communicating with a volume in which the evaporation of said liquid solvent may take place and which is kept under a pressure essentially equal and preferably slightly lower than the vapor pressure of said liquid solvent at said temperature of the cold source;

and at least one condensation surface, such as a plate or analogous feature in contact by its outer face with the calorie-bearing fluid making it possible to extract the reutilizable heat produced essentially at the temperature of the hot source, and on the inner face of which the solvent vapor condenses and mixes with a second liquid (brine) which flows essentially at the temperature of the hot source, said inner face of the plate forming a condensation surface communicating with said volume and arranged at a short distance and preferably essentially facing said evaporation surface.

According to a preferred characteristic of the invention, several of the aforementioned systems are connected serially, the condensation plate of the row n stage constituting by its other face the vaporization plate of the row n+1 stage.

With such systems, a very economical, compact and very effective construction is obtained, making it possible to raise in several stages and by the use of easy-to-handle and low-corrosion solutions the temperature level of the heat taken from the cold source by some hundred degrees or more, to be utilized at the temperature of the hot source.

The invention also concerns systems for reutilization of low-level thermal energy characterized by the fact that they make use of evaporator-mixer devices of the type mentioned above, and in connection with these devices evaporator-separator devices making it possible to separate or reconstitute said liquid solvent and said concentrated solution (brine) by the techniques of evaporation and condensation from the diluted solution in order to allow the autonomous and unlimited operation of the system.

Advantageously, the evaporator-separator devices utilized will have a structure of evaporation and condensation surfaces similar or identical to that of the aforementioned evaporator-mixers.

It is immediately obvious that utilization of evaporator-mixers and evaporator-separators in association makes it possible to operate these devices discontinuously, independently of one another, and in particular nonsimultaneously. This is an advantage, since under certain conditions it will for example be possible to operate the evaporator-separators by solar energy when it is available, and operate the evaporator-mixers when heat will be needed for example to heat a home, and most especially when solar energy is not available.

By connecting to the system one or more storage vats for the brine, the diluate and the solvent, it thus becomes possible to store at room temperature and without having to take any special precautions the "noble" energy accumulated during daylight hours, particularly in summer, and to use this noble energy in the evaporator-mixer devices to heat a building during cold hours and in particular in the winter by borrowing the primary energy flow from an available "cold source," for example such as a surrounding body of water, industrial or power-plant discharge water, or the ambient air.

The invention likewise refers to a process for air-conditioning a building by using evaporator-mixer devices and systems associating evaporator-mixers and evaporator-separators, said process being characterized by the fact that evaporator-mixers are used to air-condition the building on its interior surfaces and evaporator-separators to reconstitute the brine and the pure solvent on its exterior surfaces.

According to a preferred process for air-conditioning a building using evaporator-mixer devices mounted serially according to the invention, the available low-level energy source is utilized to operate certain aforementioned devices to raise the temperature of the calorie-bearing fluid coming out of the device in relation to that of said source, and to heat certain parts of the building, and the available low-level energy source is utilized to operate other aforementioned devices to lower the temperature of the calorie-bearing fluid coming out of the device in relation to that of said source and to cool other parts of the building, said energy source being utilized in an intermediate evaporator-mixer stage.

Thus is obtained integrated air-conditioning of the building, with the cold needs serving to meet the heat needs of the building, while simultaneously the desired cooling needs (cold chamber) are met very economically.

According to another mode of implementing the invention, devices are used forming heating panels, in particular for buildings, characterized by the fact that they include, mounted on the outside of the building, evaporator-separator devices exposed to the cold exterior surfaces of the building, evaporator-mixer devices mounted inside the building opposite said evaporator-separators, and at least one thermal-exchange surface interposed between the evaporator-separators and the evaporator-mixers, to which the heat from the exploitable low-level thermal source is brought.

According to another mode of implementation of the invention, devices are utilized forming cooling panels, in particular for buildings, characterized by the fact that they include, mounted outside the building, evaporator-separator devices exposed to the warm exterior surfaces of the building, evaporator-mixer devices mounted inside the building, and at least one thermal-exchange surface interposed between the evaporator-separators and the evaporator-mixers to which the heat from the exploitable low-level thermal source is brought.

It will be noted that such a design is perfectly well adapted to the needs of building air-conditioning, the device being more effective as the climatic conditions are more rigorous. In other words, the harsher the outside cold, the more the heating panel will be able to heat, while inversely, the greater the outside heat the greater the cooling power of the panel.

The invention refers in addition to application of the process and devices described above to the utilization of a noble thermal energy, such as that given off by the combustion of a solid, liquid or gaseous fuel or by electrical power.

If we consider a classic system for the production of hot water, for example at 50° C. for sanitary use or heating a home, in an individual boiler utilizing the dissipation of a noble thermal energy such as that given off by the combustion of a solid, liquid or gaseous fuel or by electrical power, such a utilization of energy constitutes an unacceptable aberration and waste under the second law of thermodynamics. Indeed, using energy releasable at 1200° C. or more to heat water from 20° to 50° C. leads to dissipation of virtually the entire "value" of the noble energy.

This problem has not gone unnoticed among those in the field of thermodynamics, who have in particular proposed, especially in the case of combustion of fuel or gas, using this combustion in an engine so as to produce noble mechanical energy and heat. The noble mechanical energy may be used to drive "heat pumps" which, if the sole purpose of the installation is to supply heat, make it possible to improve in particular the thermal output of the cycle. The drawback to these systems is that they are very complicated, that they require major maintenance costs, and that they are subject to wear, especially as regards the internal combustion engines used in them. In addition, calculations show that in the best of cases they do not exceed an output of 150% that of the lower calorific power (PCI) of the fuel that would be utilized directly to produce the required heat. In many cases, the output drops below 130% or barely exceeds 100%.

When the noble energy is present in the form of available electricity, the use of this electricity to drive "heat pumps," which are nothing more than refrigerators operating in reverse, is also known. Here again, the utilization output depends in large measure on the conditions of use, and especially on the temperature difference between the "cold" source from which is taken the energy and the "hot" source to which the energy is released. For low differences in temperature, the output may reach 200%. Unfortunately, this output declines when the difference in temperatures between the cold source and the hot source increases, which is a major drawback for home heating systems utilizing such heat in which the cold source normally consists of the outside environment. However, the essential drawback to these systems is that they make use of compressors, which are costly, relatively fragile and subject to wear.

The invention makes it possible to solve the above-mentioned difficulties by proposing an extremely simple and economical system of construction, essentially making use static parts which are practically not subject to wear, and by making it possible to multiply by 2, 3, or even 4 or more the amount of heat released at the temperature of use over the amount of heat available in the noble, undissipated state.

To this end, the invention's improvements apply to a system utilizing the aforementioned evaporator-mixer devices, in which system the boiler heated by the noble energy is used first to assure the formation or reconstitution in the evaporator-separators of concentrated solutions (brines) from diluted solutions (diluates), said brines being intended to supply said evaporator-mixers, said diluates coming from said evaporator-mixers, which evaporator-mixers serve to extract heat coming from a low-level source. In this way, it is virtually impossible to utilize the "dissipation" of the available noble energy only to form or reconstitute brines from diluates, which solutions will make it possible to extract from a cold source the desired higher-level thermal energy. This dissipation of the noble energy will take place without any major consumption of energy, which energy can finally be utilized to reheat to the desired temperature sanitary water, for example, or central-heating water that is to be produced, the output of such an operation being virtually as good whether the energy is released at a very high level, for example 1200° C., or at a lower level, for example 55° C.

According to another characteristic of the invention, said evaporator-mixers are only utilized when the need for heat necessary to heat said primary fluid is not met by the thermal discharges from the boiler; after being worked in said evaporator-separators, the concentrated solutions (brines) formed and not utilized are stored for subsequent use. Thus it is obvious that with an installation having a relatively low rated power it is possible to release instantaneously and continuously a far greater thermal power by "consuming" the stored brines, which are worked in the system's evaporator-mixers to extract from the low-level cold source the heat required over the rated power of the boiler. Thus the installation has a very great flexibility of use. If the heating shell is electric, the boiler will be able to operate continually during nonpeak hours when electrical energy is less expensive, independently of consumption needs. Consumption needs will be met essentially with the evaporator-mixers, the autonomous operation of which will be assured by the available stored brines reconstituted by the boiler when it is running.

The invention, its implementation, its purposes and advantages will appear more clearly with the aid of the following description, given with reference to the attached drawings, in which:

BRIEF DESCRIPTION OF THE FIGURES

FIG. 13 shows diagrammatically the configuration of a cooling panel associating evaporator-separators, evaporator-mixers, a residual heat source and an ambient heat source;

FIG. 14 shows the temperature chart through the device in FIG. 13;

FIG. 15 shows, as in FIG. 13, the configuration of a heating panel associating evaporator-separators, evaporator-mixers, an ambient heat source, and a cold source;

FIG. 16 shows the temperature chart through the device in FIG. 15;

DETAILED DESCRIPTION OF THE INVENTION

Figure 1:
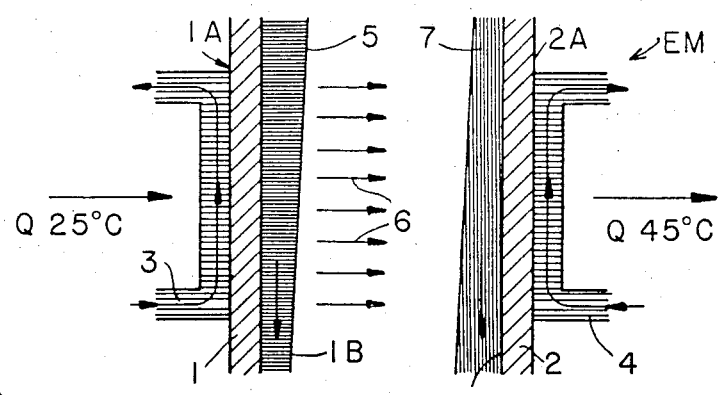
FIG. 1 shows a diagrammatic vertical section of the constitution of a one-stage evaporator-mixer designed according to the invention.

We shall refer first to FIG. 1, which illustrates a device forming an evaporator-mixer according to the invention, shown in its entirety EM, making it possible to transfer an amount of heat Q borrowed from a low-level heat source called "cold source" to a second source at a higher temperature called "hot source." In other words, the evaporator-mixer device of the invention allows an amount of available heat Q at a given temperature, for example 25° C. to be transferred over one face 1 of the device and released after passing through the device over a second face 2 at a higher temperature, for example 45° C.

In the example of realization illustrated diagrammatically the low-level available heat source consists of a fluid current, for example residual water essentially at the temperature of the "cold source," brought in by a pipe 3 to exchange heat with one (exterior) face 1a of the plate 1 of the device.

The heat is taken from the device at the temperature of the "hot source" by a calorie-bearing fluid, such as, for example, water carried by a pipe 4 to exchange heat with the (exterior) face 2a of the device's plate 2.

The transfer of heat from the plate 1 to the plate 2 and the rise in the thermal level of the transferred heat is achieved by evaporation of a film of a fluid (solvent) such as, for example, fresh water 5 streaming down over the (interior) face 1b of the plate 1 heated by the fluid 3 constituting the low-level available heat source, and by condensation of the vapor produced, transfer of which is diagrammed by the arrows 6, on the (interior) face 2b of the plate 2 mixed with a second fluid or saturated solution of an aqueous solution (brine) flowing in a film moistening the face 2b of the plate 2.

This heat transfer and the increase in the level of the conveyed heat is made possible by application of the laws of thermodynamics, as soon as the "solvent" constituting the film 5 and the "solution" constituting the film 7 are in vapor-pressure equilibrium at different temperatures.

The thermal example shown corresponds to the use for the film 5 of a film of fresh water and for the film 7 of an essentially saturated solution of calcium chloride in water.

Figure 2:
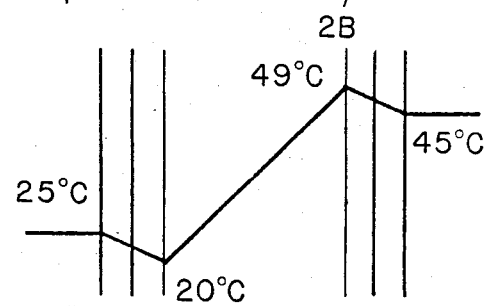
FIG. 2 shows the temperature chart as the evaporator-mixer in FIG. 1 is traversed.

FIG. 2 gives by way of example the temperature chart which, by taking into account thermal drops through the thin exchange plates 1 and 2, make it possible to obtain a temperature for the output fluid of 45° C. with an intake fluid temperature of 25° C.

In order for the device to be able to function, it is only necessary to supply the plate 1 with low-level thermal fluid 3, to supply the fresh-water film 7, and to recover the higher-level fluid by the calorie-bearing exchange fluid 4.

When the heat is transferred, some fresh water evaporates, which it is necessary to regenerate or to make up; the brine is also diluted, and either fresh salt must be added or the salt regenerated from the brine. Obviously, the "noble" energy making it possible to raise the temperature of the heat borrowed from the cold source is provided by the heat from the salt dissolving in water.

In the remainder of the description, for purposes of simplification we shall speak essentially of water and brine, or in some cases "solvent," "aqueous solution," and "solution." It must be understood that the invention can function with various sorts of solvents and aqueous solutions, provided that there is relatively significant heat from dissolving the aqueous solution in the solvent: the greater the dissolving heat, the greater the possibility of raising the thermal level of the cold source in a single evaporation-mixing stage. Among such "solvent" and "aqueous solution" couples, we may in particular cite the following:
  water/lithium chloride,
  water/lithium bromide,
  water/calcium chloride,
  water/caustic soda,
  water/zinc chloride,
  water/sulfuric acid, etc.

Using water as a solvent is advantageous because of the fact that water is both an economical solvent and has a high vaporization heat.

Furthermore, selection of the solvent-solution couple can be determined by local conditions of utilization and criteria of resistance of the materials and corrosion. Additives may be added to the solution to limit corrosion phenomena.

Figure 3:
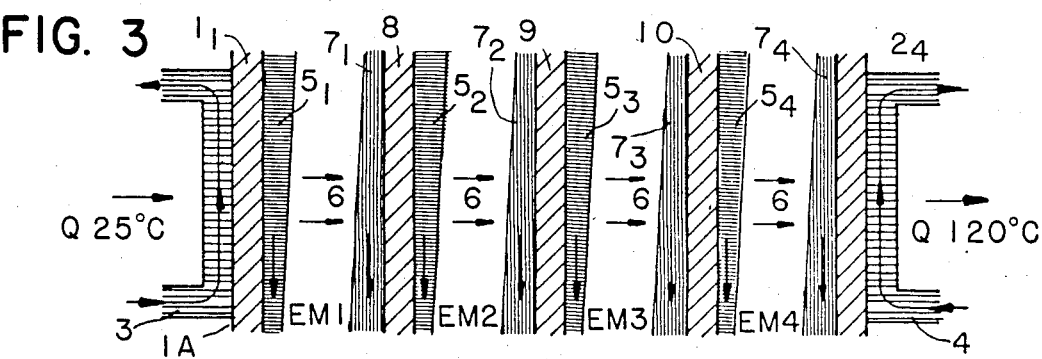
FIG. 3 shows as in FIG. 1 an evaporator-mixer having four stages assembled serially.
Figure 4:
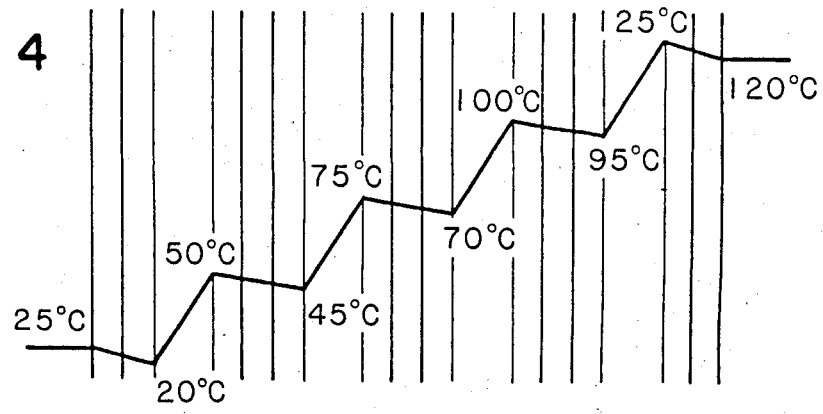
FIG. 4 shows the temperature chart when the device in FIG. 3 is traversed.

If it is wished to obtain a major increase in temperature from the cold source to the hot source without making use of very corrosive solvent-solution couples such as water-sulfuric acid, it is possible to assemble serially several evaporator-mixers according to the invention, as illustrated in FIGS. 3 and 4.

Thus, as illustrated in FIG. 3, four evaporator-mixers are assembled serially, one behind the other.

On the exterior face $1a$ of the plate $1_1$ of the first evaporator-mixer stage $EM_1$, the low-level heat is brought from the cold source, the current 3 of which contributes its heat to the plate $1_1$. The water film $5_1$ flowing over the length of the plate $1_1$ evaporates in the volume left free between the plate $1_1$ and the opposite plate 8 over which flows the brine film $7_1$ which assures the dissolving and condensation of the vapor 6, simultaneously assuring the transfer of the heat Q and the raising of the temperature, as illustrated by the temperature chart in FIG. 4. By its face opposite the plate $1_1$, the plate 8 forms a vapor condensation surface, and by its other face forms an evaporation face for the water film $5_2$ from the second evaporator-mixer stage $EM_2$.

Everything occurs in the second stage $EM_2$ just as in the first stage, except that the water film $5_2$ is evaporated in the second evaporator-mixer $EM_2$ at a higher temperature than that at which the water film $5_1$ evaporated in the first stage $EM_1$. In the example illustrated, a very modest rise from the initial 25° C. to 45° C. at the level of the film $5_2$ has been assumed.

The vapor produced from the film $5_2$ is dissolved and condensed at a higher temperature, 75° C. in the example illustrated, in the brine film $7_2$ streaming over the face opposite the following plate 9 forming a condensation plate in the second stage $EM_2$ by one of its faces and an evaporation plate in the third stage $EM_3$ by its other face.

Step by step, in four stages, it is easily possible with a water/calcium chloride solution couple to obtain a rise in temperature in the heat Q borrowed from the cold source 3 from 25° C. to 120° C. recovered by the calorie-bearing fluid 4 which collects the heat on the exterior face of the last plate $2_4$ of the evaporator-mixer $EM_4$.

Of course, the pressures in each stage $EM_i$ will be adjusted to the value essentially corresponding to equilibrium of the vapor pressures in the water/saline solution couple at the temperatures contemplated in each stage.

The differences in pressure between the outer faces $1_1$ and $2_4$ of the system can easily be withstood by providing several cross-pieces (not shown) between the successive plates $1_1$, 8, 9, 10, $2_4$. Other structures of very simple, rigid structure will be proposed below, in particular in relation to the FIGS. 21 to 25.

Finally, it will be noted that the evaporator-mixers will be all the more effective and less cumbersome as the interval between the facing evaporation and condensation plates is reduced, so that the transfer of vapor illustrated by the arrows 6 can be very effective. With such a device, it is reasonable to expect to achieve heat-transfer flow densities on the order of 20 to 30 kw/m² and more.

Figure 6:
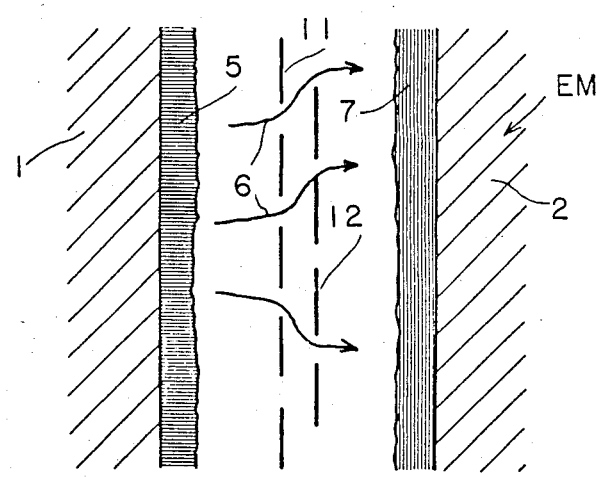
FIG. 6 shows in larger scale a detail of construction utilizing a vapor-permeable wall between the evaporation surface and the condensation surface of an evaporator-mixer.

In some cases, especially in the case of evaporator-mixers working at a relatively high temperature, it will be possible to provide, as shown in FIG. 6, interposed between the plates 1, 2 opposite the evaporator-mixer EM, some baffles 11, 12, for example of polished reflective metal, perforated with a great many holes, offering virtually no resistance to the passage of the vapor according to the arrows 6 but effectively opposing the thermal radiation from the cold plate 1, also the "priming," i.e., the transfer from film 5 to film 7 of drops of the liquid solvent going to be dissolved in the solution 7 without evaporation, which would considerably reduce the heat transfer in such an evaporator-mixer.

Figure 5:
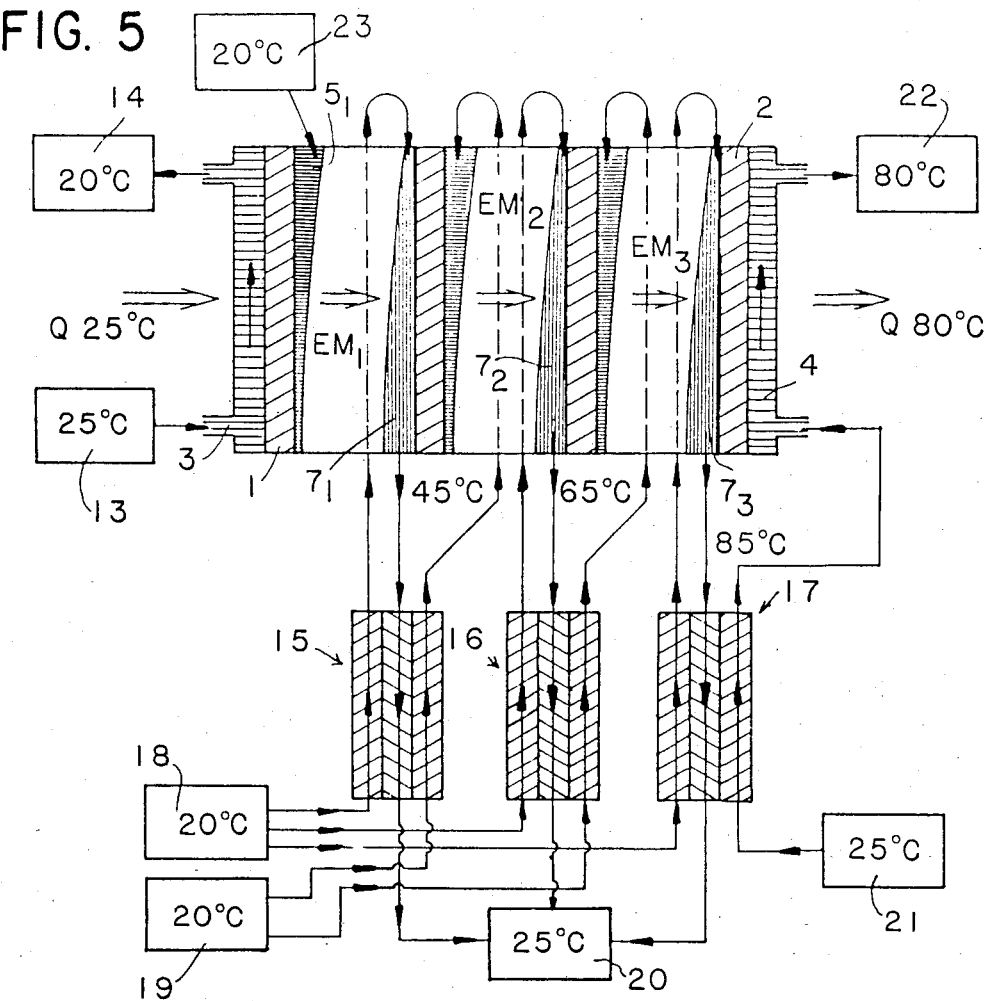
FIG. 5 shows a diagram of an installation utilizing a three-stage evaporator device connected to heat recovery exchangers.

We shall now refer to FIG. 5, in which an installation has been described that utilizes serially assembled evaporator-mixers connected to heat exchanger-recuperators to supply a "hot source" with heat from a residual heat source constituting a "cold source." In the example illustrated, a system has been assumed that includes three evaporator-mixers assembled serially $EM_l$, $EM_2$, $EM_3$ allowing the transfer of an amount of heat Q supplied for example at a temperature of 25° C., and its recovery at a higher temperature of 80° C.

In the example illustrated, the low-level heat is brought by the calorie-bearing fluid 3 to the intake plate 1 of the first evaporator-mixer $EM_1$. The calorie-bearing fluid from the residual heat source penetrates at 13 for example at a temperature of 25° C. and exits at 14 at a temperature of 20° C. This drop in temperature from the "cold source" is used to advantage to evaporate the water film $5_1$ in the first evaporator-mixer stage $EM_1$.

The operation of the three serial exchanger-mixers is identical to that of the other exchangers in FIG. 3 and will not be described again.

In contrast, the sensitive heat of the diluates (diluted solutions) $7_1$, $7_2$, $7_3$ leaving the exchanger-mixers $EM_1$, $EM_2$, $EM_3$ at temperatures of 45° C., 65° C. and 85° C. respectively, for example, is put to advantage to reheat in heat exchangers of any appropriate type 15, 16, 17 the fresh brine supplies 18 (brought in for example at 20° C.) necessary for the operation of the three stages, as well as the fresh water supplies brought in at 19 (for example at 20° C.) in the evaporator-mixer stages 2 and 3.

The diluted solutions are collected at 20, for example at around 25° C., and will either be regenerated or stored, or possibly discharged, depending on the location of the installation (in particular if it is near the sea or major rivers accepting discharges of diluted saline solutions).

At 21, the intake of the calorie-bearing fluid has been shown; the fluid may be made to pass through the exchanger 17 in order to reheat it before coming into contact with the condensation plate 2 of the last evaporator-mixer stage $EM_3$ to supply at 22 the hot calorie-bearing fluid, exiting for example at a temperature of 80° C.

In FIG. 5, it has been accepted that the fresh water brought in at the head of each evaporating film is completely evaporated as it streams over the wall. Of course, if this is not the case and a residue of pure water reaches the base of the wall, the device need only be equipped with a system of gutters to collect this water and reinject it at the top of the wall; this system is not shown here.

The flat-plate exchangers of the type described in the preceding figures have the advantage of simplicity of manufacture and are quite suitable for relatively low-temperature and low-pressure uses. However, if the temperatures and hence the pressures rise, these exchangers, which have many joints, run the risk of being poorly adapted.

Figure 7:
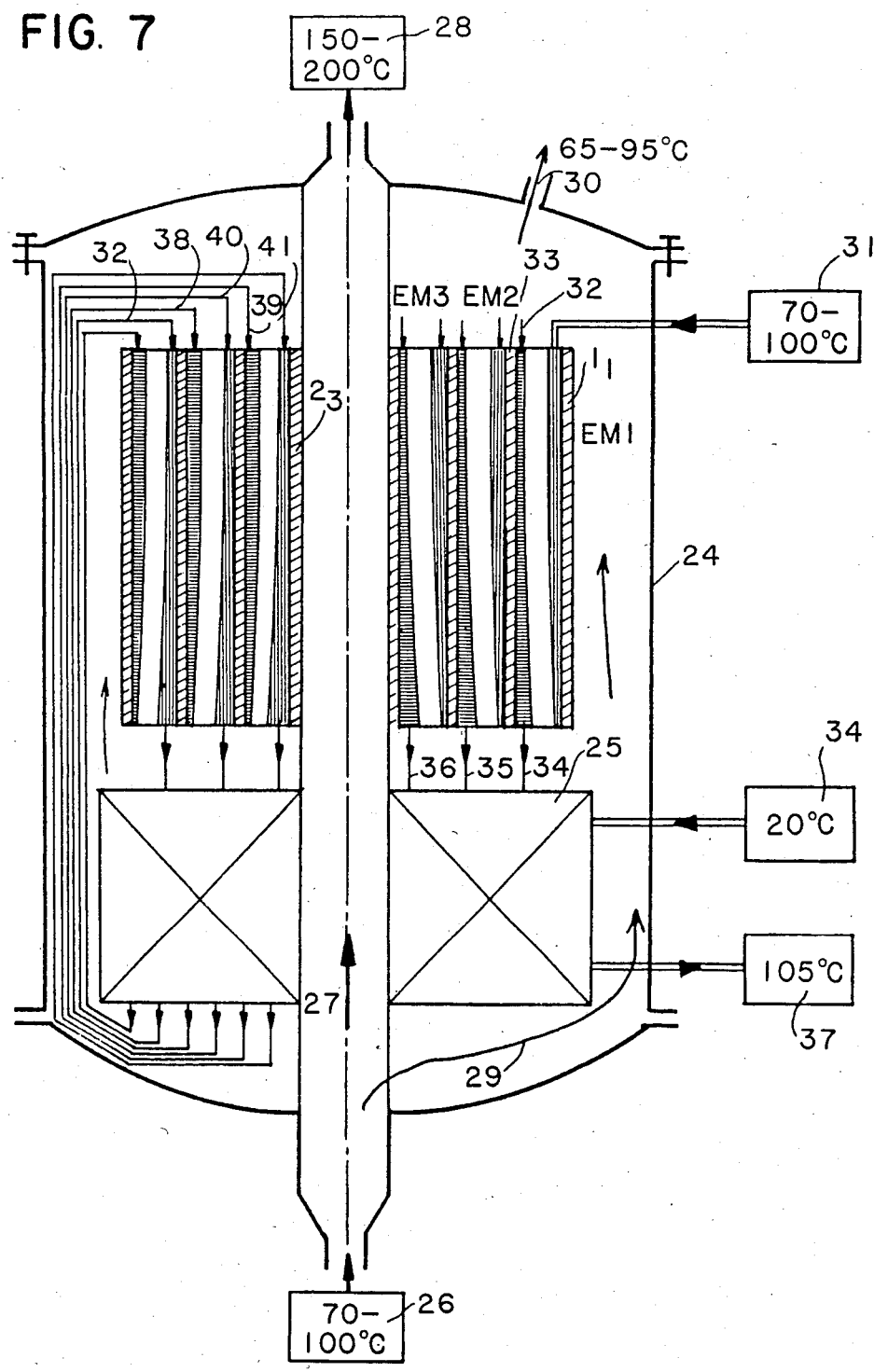
FIG. 7 shows a vertical section of an installation having a three-stage serial evaporator-mixer connected to heat recovery exchangers and constituting a cylindrical-circular shape.

In FIG. 7 a three-stage serial evaporator-mixer exchanger of a cylindrical type has been diagrammatically described, making possible the operation of the installation at high pressures and temperatures.

According to the example illustrated, the device includes three exchanger-mixers arranged concentrically $EM_1$, $EM_2$, $EM_3$ operating serially according to the same principle described in the preceding figures, and in particular in FIG. 5.

These three exchanger-mixers are mounted inside a vertical, cylindrical vat 24.

Below the evaporator-mixers $EM_1$, $EM_2$, $EM_3$ are mounted heat exchangers 25, for example likewise housed in the vat 24, which can operate like the exchangers 15, 16, 17 in FIG. 5.

The device is essentially adapted to reutilization of the low-pressure vapor condensates in the form of liquid water which can be introduced into the installation as illustrated at 26 at around 70°–100° C., for example. Some of this water passes according to the arrow 27 through the center of the exchanger and heats up in contact with the last condensation wall $2_3$ of the exchanger $EM_3$ to a maximum temperature depending on the installation, which may reach 150° to 200° C., for example. Thus at 28 medium-pressure vapor, for example at 15 bars and 200° C. is recovered, adapted to any industrial use.

Another part of the water from the 70°–100° C. supply circulates according to the arrows 29 inside the chamber 24 and serves to heat the first stages of the exchangers 25 and the first stage of the evaporator-mixer $EM_1$ on its exterior face $1_1$, which bathes inside the envelope 24 in this ascending water current. Any surplus in the water thus supplied in the device can be extracted as indicated at 30, for example at a temperature of between 65° and 95° C.

The fresh water flowing over the exterior plate $1_1$ of the first-stage exchanger-mixer is brought in as indicated at 31 at the temperature at which it is available of 70° to 100° C., this water advantageously consisting of a small amount derived from the source 26. The brine is brought in as indicated by the arrows 32 over the face of the plate 33 communicating with the interior space of the exchanger $EM_1$ from a storage source 34, at 20° C. for example, and after being heated through the exchangers 25.

The exchangers 25 are heated by the diluted brine solution escaping from the three evaporator-mixer stages $EM_1$, $EM_2$, $EM_3$ as indicated by the arrows 34, 35, 36, at temperatures going as high as the temperature of the hottest plate $2_3$ of the last exchanger-mixer stage $EM_3$. The diluted solutions escape from the exchangers 25 as indicated at 37, for example at around 105° C. They are advantageously treated at this temperature by evaporation-separation to reconstitute the brine. This evaporation-separation treatment can be performed in devices which will be described below.

Obviously, the evaporator-mixers $EM_2$ and $EM_3$ operate similarly to the exchanger-mixer $EM_1$, but at higher temperatures. At 38, 39 we have shown the supplies of the water films of the second and third stages, respectively (at increasing temperatures), and at 40, 41 the supplies of brine of the second and third stages (at increasing temperatures).

In order to reconstitute these concentrated solutions (brines) from the diluted solutions (diluates), any distilling device or evaporator-separator known and used industrially, for example for desalinating sea water, may be used. These evaporator-separators may, furthermore, have a structure similar or identical to that of the evaporator-mixers EM described above, but operating in the opposite direction, so to speak.

Figure 8:
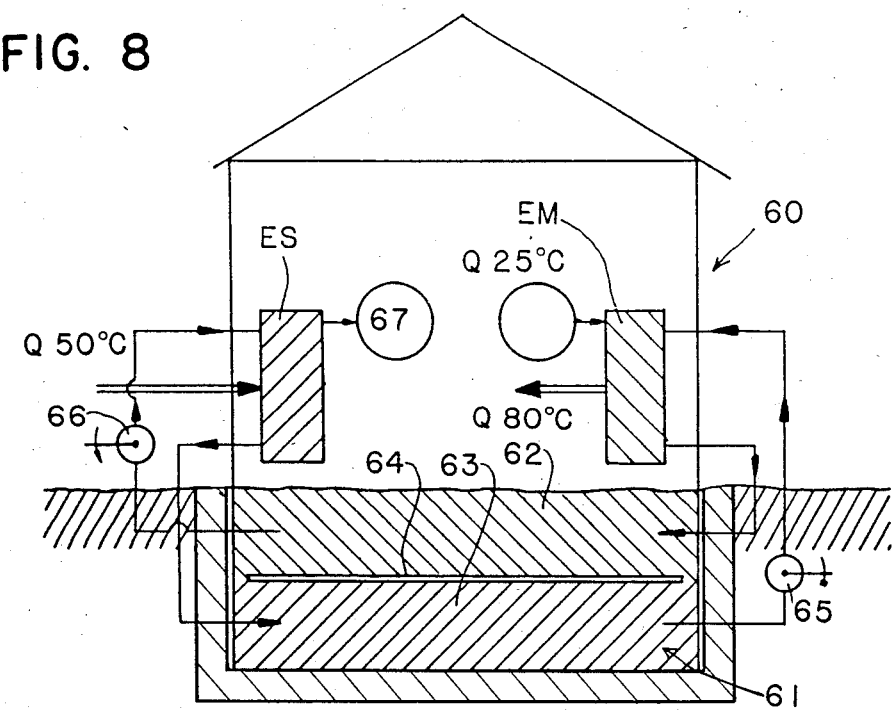
FIG. 8 shows diagrammatically a process for air-conditioning a home utilizing evaporator-mixers and evaporator-separators according to the invention.

We shall now refer to FIG. 8, illustrating the adaptation of evaporator-separator and evaporator-mixer devices according to the invention to air-conditioning a home.

In FIG. 8, a building 60 has been shown diagrammatically, in which has been installed an evaporator-mixer EM (or better, a bank of such evaporator-mixers mounted serially) and an evaporator-separator ES, or a bank of such evaporator-separators mounted serially.

Near the home, and advantageously underneath it, a storage vat 61 has been provided in which the diluted solution (diluate) is stored in the upper part 62 and the concentrated solution (brine) is stored in the lower part 63. The two solutions can be separated by simple stratification. It is also possible to provide a floating separation wall 64 between the two solutions, or one or both of the solutions may be enclosed in flexible envelopes forming balloons having volumes variable according to the amount of each solution.

If it is wished to heat the building, it is only necessary to provide the evaporator-mixer with low-level heat, for example at 25° C., which low-level heat may be borrowed from residual water, for example. The evaporator-mixer will make it possible to transfer into the building essentially the same amount of heat but at a higher temperature, for example 80° C., provided that the evaporator-mixer is given the quantity of concentrated saline solution necessary to its operation. This quantity is drawn by the pump 65 from the volume 63 in the tank 61. Obviously, when the evaporator-mixer is provided with a concentrated saline solution drawn off the reserve 63, a diluted saline solution (in a slightly greater volume) is simultaneously produced, which is stored in the tank 62.

Under favorably sunny conditions, and in particular in the summer, it will be possible to supply the evaporator-separator ES with the amount of heat at a suitable level, for example at 50° C., which will make it possible to reconstitute the concentrated saline solution from the diluted saline solution. Under such conditions, it will only be necessary to start up the pump 66 which will bring in the diluted saline solution drawn from the tank 62 to the bank of evaporator-separators producing the concentrated saline solution delivered to the tank 63. Fresh water will be produced at the same time at 67.

The evaporator-separator can also operate, if desired, with any residual heat source, or even on electrical heat at nonpeak hours.

In terms of practicality, the installations are reasonable, since everything occurs as if the homes were being heated with brine, given a calorific power of brine close to one-twentieth that of domestic fuel, with the possibility of regenerating the brine and storing it for a long period of time whenever surplus energy is available.

Figure 9:
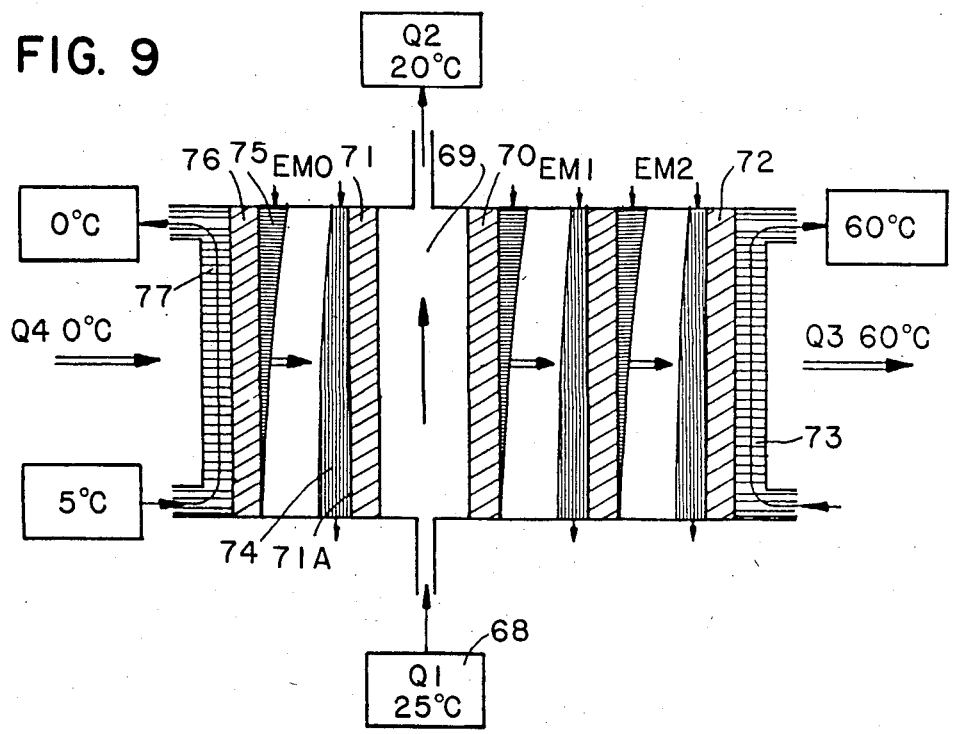
FIG. 9 shows a diagrammatic section of the use of several evaporator-mixers mounted serially to produce heat from a low-level heat source at a higher level, and cold simultaneously.

We shall now refer to FIG. 9, which describes a system particularly well adapted to utilization in industrial or housing buildings.

In housing, and in certain industries, there is a need for both heat, especially for heating the buildings, and for cold at the same time, especially for keeping foodstuffs, etc.

According to the invention, it is possible with a single installation to produce heat and cold at the same time, by judiciously connecting evaporator-mixers to a low-level residual heat source.

As illustrated in FIG. 9, if a $Q_1$ 25° C. heat source is available, it will supply as illustrated at 68 the exchange volume 69 closed on one side by the vaporization plate 70 of the first stage $EM_1$ of an evaporator-mixer and on the other side by the condensation plate 71 of an evaporator-mixer $EM_0$. In the example illustrated, the evaporator-mixer $EM_1$ is followed by an evaporator-mixer second stage, these two evaporator-mixers operating serially and forming a heat pump as has been previously described, in particular with regard to FIGS. 1 and 3. In the example illustrated, it is assumed that the outer wall 72 of the exchanger-mixer $EM_2$ is brought for example up to 65° C., making it possible to heat to 60° C. the calorie-bearing fluid 73, assuring the heating of the installation.

As for the exchanger-mixer $EM_0$, it works as a refrigerator, the surface 71a of the plate 71 serving as a condensation surface over which the brine flows, making it possible by evaporation of the water film 75 on the outer plate 76 of the exchanger-mixer $EM_0$ to achieve refrigeration, for example from 5° C. to 0° C. of a cold-bearing fluid in contact with the outer surface of the plate 76.

It will be noted that in such an installation, in contrast to the classical techniques, it is neither more expensive nor more difficult to produce cold than it is to produce heat, and the installation as a whole is not noticeably complicated.

An especially interesting situation is that in which the heat flow $Q_3$ supplied to the part of the building to be heated will be equal in absolute volume to the heat flow $Q_4$ taken from that part of the building to be cooled. Under these conditions, there will not even be a need to make use of an ambient heat flow, since $Q_2 - Q_1 = 0$.

Figure 10:
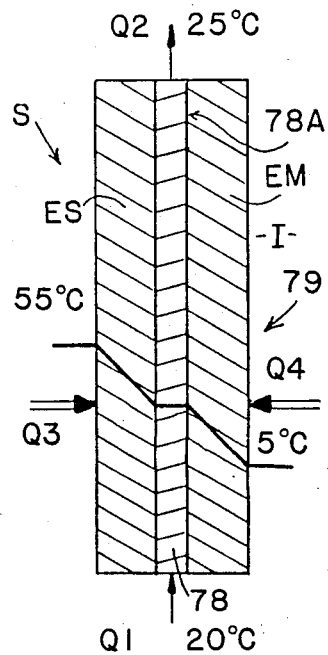
FIG. 10 shows diagrammatically the connection of evaporator-mixers and evaporator-separators to form a cooling panel, in particular for homes.

We shall now refer to FIG. 10, which describes a method for realizing a cooling panel 79 particularly well adapted to buildings.

The panel includes an evaporator-mixer EM and an evaporator-separator ES, separated by a volume 78 traversed by a fluid such as water, for example at ordinary room temperature, 20° C.

Assuming that the evaporator-separator ES is exposed on the south face S of the building to solar radiation, its outer surface can be raised for example to 55° C. It is thus possible in this evaporator-separator to produce from a diluted salt solution a concentrated solution, the evaporated fresh water condensing at the temperature of the cold source (here assumed equal to 20° C.).

With the concentrated brine produced by the evaporator-separator, it is possible to operate the evaporator-mixer EM, using as the evaporator-mixer's cold evaporation surface the inside face I of the building, the condensed water vapor being collected in a mixture with the concentrated saline solution on the hot condensation face 78a of the evaporator-mixer EM in contact with the volume 78 (about 20° C. in the example illustrated).

With such a panel integrating a single evaporator-mixer stage and a single evaporator-separator stage operating with water and brine, it is possible to obtain a temperature on the inner face I of the panel close to 5° C. quite easily.

It will be noted that such a cooling panel is more effective as the outer surface subjected to solar radiation S grows hotter, which is ideal, refrigeration being more effective the more intense the exterior heat.

Figure 11:
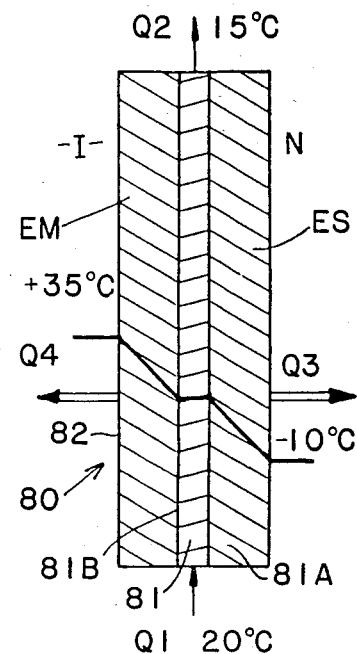
FIG. 11 shows, as in FIG. 10, how a heating panel is formed by connecting evaporator-mixers and evaporator-separators.

With reference to FIG. 11, the realization of a heating panel 80 operating inversely, so to speak, to the cooling panel in FIG. 10 will now be described.

This panel, like the cooling panel 79, includes an evaporator-mixer EM and an evaporator-separator ES.

As in the preceding example, it is the evaporator-separator ES which is exposed on one of its faces to the outside of the building, but this time to the coolest facade, for example the north facade which will be assumed to be at $-10°$ C. This evaporator-separator face is obviously the "cold" face, while the warm face consists of the wall 81 forming the center of the heating panel 80, which wall is kept at a temperature close to 20° C. by a fluid such as water constituting the available low-level heat source. In the example illustrated, it has been assumed that a heat flow $Q_1$ was supplied at 20° C. to the panel 81, the calorie-bearing fluid being assumed to leave the panel at a lowered temperature, at 15° C. as indicated at $Q_2$. The difference in temperature between the "warm" face brought to 20° C. of the evaporator ES and its "cold" face brought to $-10°$ C. exposed to the cold north wind permits the operation of the evaporator-separator and the manufacture of a concentrated solution from a diluted solution. The evaporator-separator ES operates more effectively as the temperature of the "cold" source drops.

While the wall 81 forming a heat exchanger supplied by the low-level thermal fluid constitutes on its face 81a the heating wall of the evaporator ES, on its face 81b the exchanger 81 forms the cold part of the evaporator-mixer EM.

The warm face of the evaporator-mixer EM is turned towards the interior I of the building. If the wall 81b is at around 15°-20° C., it is easily possible to obtain with a single evaporator-mixer stage and the use of a brine a temperature on the face 82 of about 35° C. It is at this temperature that the heat flow $Q_4$ is introduced into the building.

Comparing FIGS. 10 and 11, we find that the cooling panel in FIG. 10 makes it possible to "pump" into the available low-level thermal fluid the heat which it is desired to eliminate $Q_3$, $Q_4$ on the two faces of the panel at two different temperature levels, while in the case of the heating panel in FIG. 11 the heat amounts $Q_3$ and $Q_4$ are extracted from the available low-level thermal fluid, the lower-level heat $Q_3$ being discharged to the outside, and the higher-level heat $Q_4$ serving to heat the building.

Figure 12:
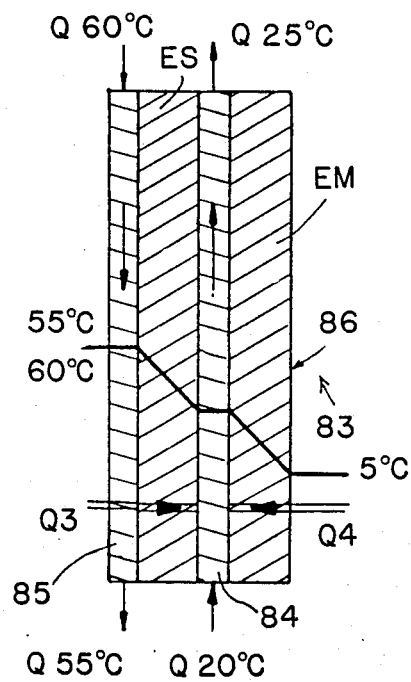
FIG. 12 shows diagrammatically, as in FIGS. 10 and 11, the constitution of a cooling panel utilizing a residual heat source.

According to the mode of realization illustrated and diagrammed in FIG. 12, a cooling panel 83 has been shown composed essentially of an exchanger-mixer EM, an exchanger-separator ES, and two heat exchangers 84, 85 supplied respectively by an "ambient" heat source, for example at 20° C., and by a residual heat source, for example at 60° C. In the figure the various temperatures that may exist at each spot have been indicated.

The operation of this panel is entirely similar to that in FIG. 10, except that the heat $Q_3$ is provided to the evaporator-separator ES not by the solar radiation to which the panel was exposed in FIG. 10 but rather by the heat exchanger 85 utilizing the residual heat fluid at about 60° C. which is assumed to be available.

In the example illustrated, the evaporator-separator and the evaporator-mixer have a single stage and operate with aqueous saline solutions of the calcium or lithium chloride type. Such an installation makes it possible to achieve a cold-wall temperature 86 close to 5° C., which may constitute an ideal temperature for cold chambers, especially for the keeping of fruits, vegetables and other foodstuffs. It is clear that such an installation is very economical in terms of operating costs and design.

We shall now have reference to FIGS. 13 and 14, in which the configuration of a cooling panel of the type described above in FIG. 10 has been illustrated more precisely.

To extract the heat which it is desired to discharge on the inner wall 88 on the inside I of the building, there is an available low-level heat source 87, for example the water from a river assumed in the example illustrated at 18° C. After passing through the central exchanger 78 of the panel, the water will be discharged at 89, for example at 23° C.

The solar radiation S heating the exterior face 90 of the building will allow evaporation in the evaporator-separator ES of the diluted solution 91 to concentrate it, making it possible to regenerate the brine which will be sent back by a pump 92 to the head of the evaporator-mixer EM on the surface of the "warm" plate 78a of the evaporator-mixer.

The diluted solution produced in the evaporator-mixer EM at the base of the plate 78a is sent back by a recycling pump 93 to the top of the plate 90 to supply the film 91 of the diluted solution that will be reconcentrated in the evaporator-separator ES.

The fresh water collected in the form of the film 94 on the "cold" plate 78b of the evaporator-separator ES is likewise sent back into the evaporator-mixer EM to be evaporated on the plate 88 and to extract the heat $Q_4$ at a temperature close to 5° C. in the illustrated example.

FIGS. 15 and 16, like FIGS. 13 and 14, illustrate a realization of a heating panel operating according to the principle described in FIG. 11.

The operation of this device will not be described in further detail; it may be deduced from the foregoing. We shall only note the various circuits and pumps such as 95 making it possible to bring the diluted solution produced in the exchanger EM to the head of the evaporator-separator ES to be regenerated 96 bringing the concentrated brine produced in the evaporator ES to the head of the evaporator-mixer and 97 bringing the fresh water produced in the evaporator-separator to the head of the evaporator-mixer.

In the solution illustrated, it has been assumed that the low-level heat source 98 was available at 23° C., the fluid being discharged at 99 at 18° C. As previously explained, the heating panel operates more effectively the greater the cold on the facade 100 exposed to the north. Indeed, the colder the facade 100, the more effective the operating yield of the evaporator-separator ES, and consequently the greater the amount of concentrated brine produced, which constitutes the "noble" fuel necessary to the operation of the installation.

Figure 17:
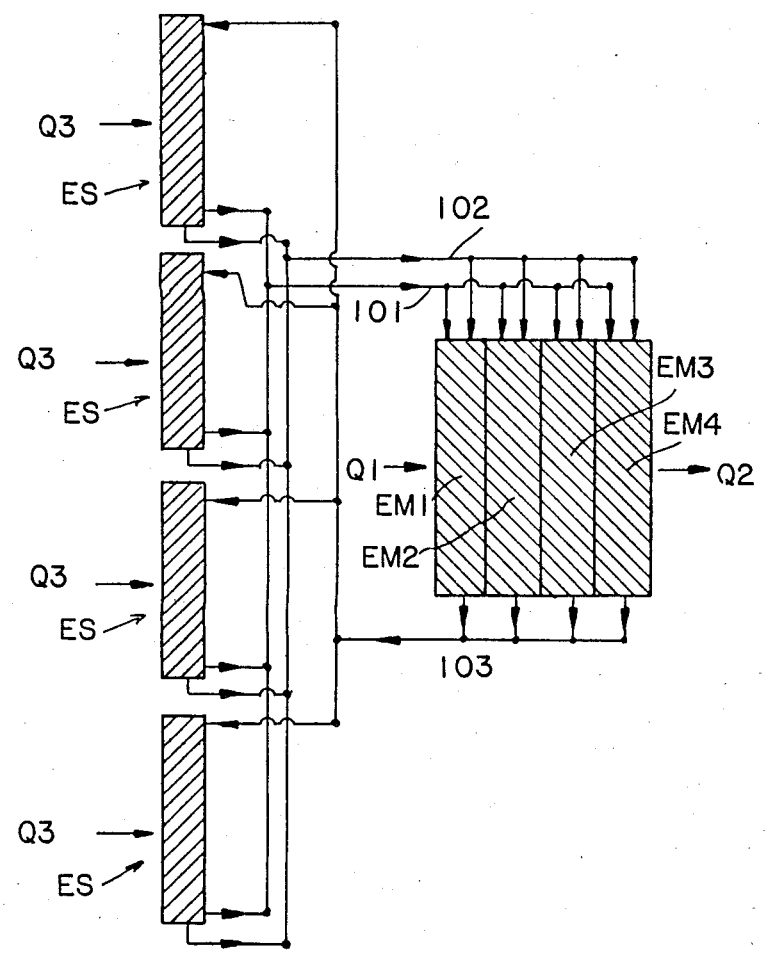
FIG. 17 shows diagrammatically an installation utilizing in association evaporator-mixers assembled serially and evaporator-separators assembled in parallel.

We shall now refer to FIG. 17 in which has been illustrated the operation of four evaporator-mixers connected serially $EM_1$, $EM_2$, $EM_3$ and $EM_4$ operating for example as has been described and illustrated in relation to FIGS. 3 or 5. This installation allows extraction from a low-level heat source an amount of heat $Q_1$ and delivery at a higher level of an essentially equivalent amount of heat $Q_2$.

As explained previously, in order for the installation to operate it is necessary to supply it continuously with the "solvent" used, such as, for example, water, and the concentrated mixing "solution," such as a concentrated brine. At 101 has been shown the solvent supply and at 102 the concentrated solution supply. The diluted solution, i.e., the mixture of the solvent and the concentrated solution, is recovered at 103 at the outlet from the exchanger-mixers.

Figure 20:
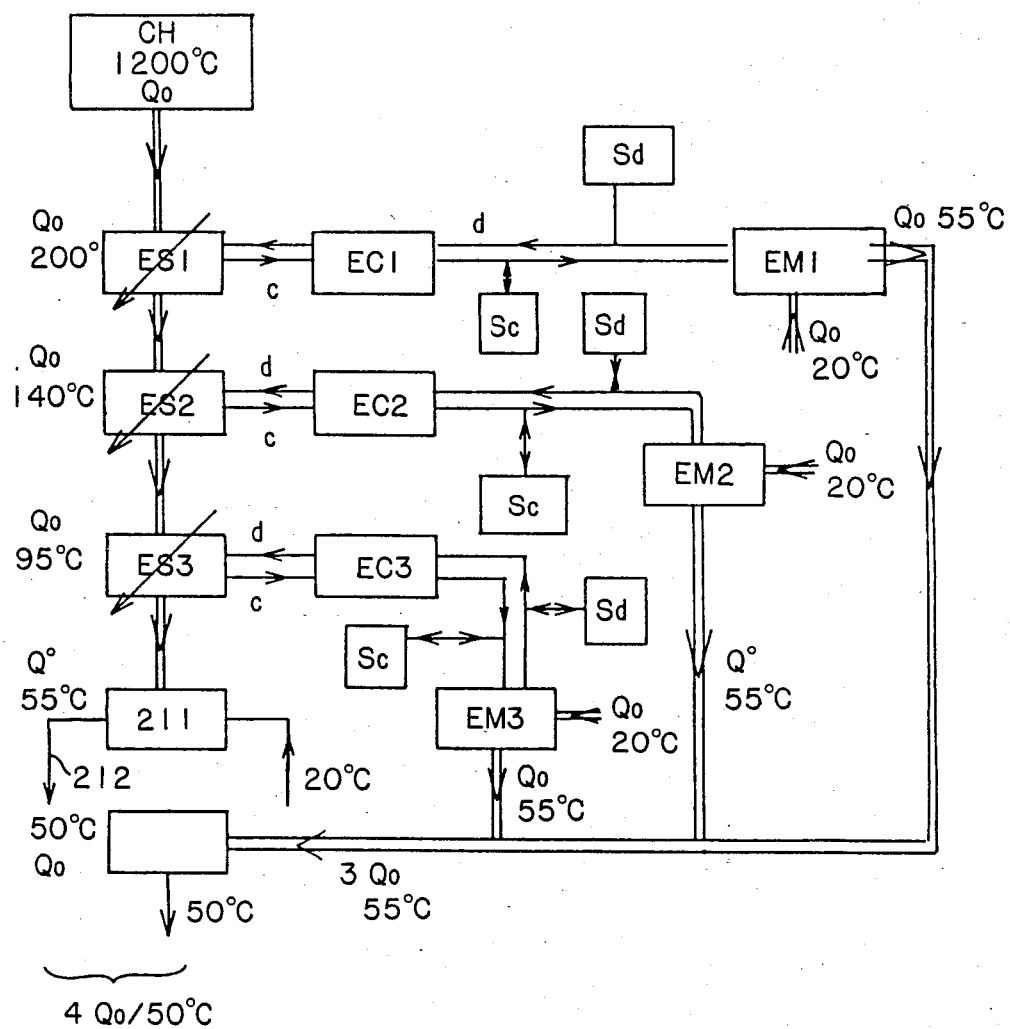
FIG. 20 is a diagram showing the operation of an installation which may be of the type shown in FIG. 18, utilizing three evaporator-separators serially feeding three evaporator-mixers and stores to produce a primary hot fluid.

To reconstitute the solvent and the concentrated solution from the diluted solution, it is possible to utilize for example several evaporator-separators which will be able to operate serially, or, generally more advantageously, in parallel. This is illustrated in FIG. 20, in which four evaporator-separators permit reconstitution of the concentrated solution and the solvent from the diluted solution. In the home heating field, each evaporator-separator may consist of a solar captor suitably oriented, for example on the roof of the building; the surface of all the captors may be essentially equal to that of the building's heating panel multiplied by the number of serially mounted evaporator-mixer stages.

Such an installation allows utilization under the best operating conditions of solar captors, while making the operating temperature of these captors essentially independent of the temperature at which it is desired to produce finally the heat $Q_2$ drawn for the most part from an available low-level heat source. By way of example, let us assume that the evaporator-separators are solar captors operating with the hot face at 55° C. and the cold face at 20° C. Their thermal power density will be limited by that of the solar radiation, for example 500 W/m2 to 1000 W/m2. The four-stage evaporator-mixer, analogous to that presented in FIG. 3, will deliver heat at 120° C. (for example in the form of pressurized water or vapor) and with a thermal power density on the order of 20 to 30 kilowatts/m2.

Thus the installation presented in FIG. 20 has the twofold advantage of raising the temperature level of the heat flow issuing from ordinary solar captors and concentrating the density of this flow.

Figure 18:
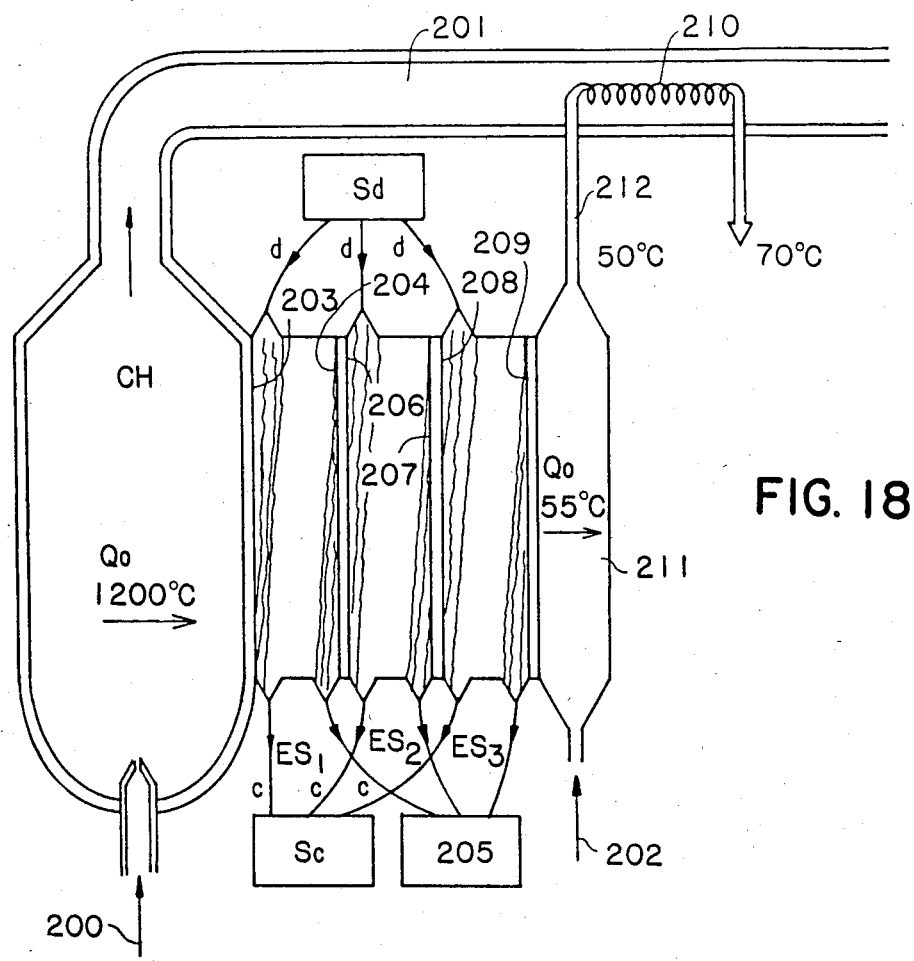
FIG. 18 is a diagrammatic section of an installation utilizing a boiler allowing the production of hot water and the regeneration of brines in three stages of evaporator-separators arranged serially.
Figure 19:
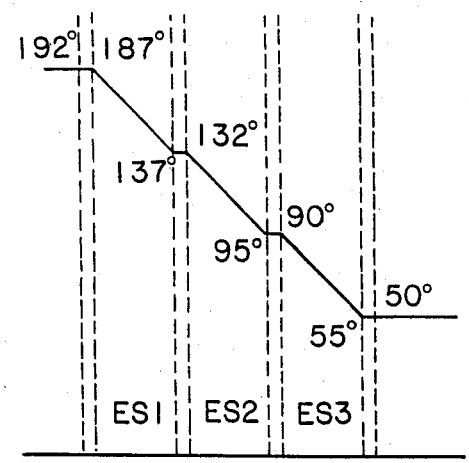
FIG. 19 shows the temperature chart on the walls of the installation illustrated in FIG. 18.

We shall now refer to FIGS. 18 and 19, illustrating the invention's application to utilization of high-level thermal energy.

As illustrated in FIG. 18, the installation includes a boiler or combustion chamber CH into which is introduced at 200 the fuel, such as fuel oil, for example. Combustion in the boiler CH raises the temperature of the firebox, for example to 1200°–1500° C. Smoke is sent into the atmosphere by a pipe 201.

In the example illustrated, the primary fluid to be heated is water introduced at 202 at about 20° C., for example. However, according to the invention, the water to be heated is not in contact with the hot wall of the boiler CH. On the contrary, the hot wall of the boiler is in contact with the face 203 of a first evaporator-separator ES1, which may be of any type described above. Over the face 203 flows the diluted solution or diluate d contained in a storage or collecting tank Sd. Below the evaporator-separator ES1, the concentrated solution (or brine) c is collected in a storage tank Sc.

Simultaneously, on the face 204 opposite the evaporator-separator ES1 condenses the solvent, which is evaporated from the diluate and collected in a storage tank 205. The diluted solution may be, for example, an aqueous solution of the water/lithium bromide type, which may be at 55% in the diluted state and 60% in the concentrated state.

In the first evaporator-separator stage ES1, the temperature chart is as illustrated in FIG. 19, the hot wall 203 of the evaporator being brought to 190° C. and the cold wall to about 135° C.

The cold face 204 of the first evaporator-separator stage ES1 is in contact with the hot face of the second stage ES2, which operates like the stage ES1 but between temperatures scaled between 132° C., the temperature of the hot face 206, and 95° C., the temperature of the cold face 207. At the base of the evaporator-separator ES2 supplied with diluate d from the storage tank Sd, the concentrated solution is collected in parallel with the evaporator-separator ES1 and is then stored in the tank Sc, as is the solvent (here, water) which is collected in the tank 205.

In the same way, the cold face 207 of the second evaporator-separator stage ES2 is in contact with the hot face 208 of a third evaporator-separator stage ES3, the cold face of which is at 55° C. as shown in the chart in FIG. 2. This third stage makes it possible to further produce concentrated solutions c from diluted solutions d.

The cold face 209 of the last evaporator-separator stage ES3 serves as hot exchange surface for heating the water forming the primary fluid 202, which is thus brought to about 50° C. at the outlet from the installation, as shown in FIG. 18 and in the temperature chart in FIG. 19. It will be noted that in such an operational system, with the exception of some negligible losses, virtually the full amount of heat $Q_0$ released at 1200° C. in the combustion chamber CH is found to be released at a temperature of 55° C. on the thermal exchange wall 209 of the last evaporator-separator stage ES3 to heat the primary water to 50° C.

It is understood that the type of installation described above makes it possible to utilize the dissipation of the energy from 1200° C. to 55° C. to form concentrated brine solutions from diluted solutions virtually without consuming any amount of heat. It follows that all the brine produced can be utilized according to the principles described before to extract from connected evaporator-mixers heat drawn from a cold source with a temperature lower than that where the heat is to be released. In this way, the installation's thermal yield is considerably improved, without making use of any complicated device or one subject to wear, the essential part of the apparatus consisting of exchange plates opposite one another at short distances, the only mechanical parts of the installation consisting of circulation pumps whose technology is perfectly well known and economical, such as central heating circulation pumps.

Advantageously, as illustrated in FIG. 18 and classically in boilers, as diagrammed at 210, there is a heat recuperator on the smoke circuit making it possible to raise the temperature of the water produced, for example from 50° C. to 70° C. Obviously, in the indicated diagram, the amount of heat recoverable in the fumes will depend essentially on their temperature, i.e., that of the hot wall 203 of the first evaporator-separator stage ES1. This recoverable amount also depends on the temperature of the water produced; the lower the latter, the greater the heat recovered, especially by condensation of the water vapor contained in the fumes.

We shall refer to FIG. 20, in which has been shown a utilization chart corresponding to the installation diagrammed in FIG. 18.

In this figure we find the boiler CH supplying an amount of heat Q0 at 1200° C. In the diagram, heat transfers have been diagrammed by close double dashes, and the direction of the heat flow has been diagrammed by arrows. The heat Q0 passes through the first evaporator-separator stage ES1, in which it traverses the hot wall, undergoing a dissipation from 1200° C. to 200° C. In more elaborate installations, this dissipation could be put to advantage in advance to operate other evaporator-separators operating with the appropriate fluids. This amount of heat Q0 is found at the outlet from the evaporator-separator ES1 in the dissipated state at around 140° C., at the intake of the second evaporator-separator ES2, which it traverses in turn to exit in the dissipated state at around 95° C. before traversing the third evaporator-separator ES3, from which it finally exits at 55° C. and is used at this level to heat the primary fluid, for example water, in the exchanger 211, allowing the water coming in at 20° C. to be raised at 50° C.

If we ignore thermal losses in the installation, at the hot water outlet at 212 essentially the same amount of heat Q0 supplied by the boiler CH and having served to raise the water temperature from 20° C. to 50° C. is collected.

We shall now consider the incoming and outgoing diluate and brine circuits of the evaporator-separators.

The first evaporator-separator ES1 delivers at its outlet a concentrate c at a temperature of around 187° C. (FIG. 19). This hot concentrate passes through a heat exchanger EC1 making it possible to heat the diluate d supplied at the head of the separator ES1 from the storage tank Sd in counter-flow. Except for the losses, the amounts of heat required are balanced in the exchanger EC1, which makes it possible to have the same heat flow Q0 at the outlet from the evaporator-separator ES1 as the initial flow. The cooled brine is stored in the tank Sc.

What has just been described for the evaporator-separator ES1 is also true for the evaporator-separator ES2 and the connected heat exchanger EC2, and likewise for the evaporator-separator ES3 and the connected heat evaporator EC3.

However, the purpose of forming brine c from diluate d is to allow supplying the evaporator-mixers, which in turn make it possible to extract low-level heat as explained in the principal application in order to reutilize it. Thus, the brine storage tank Sc connected to the evaporator circuit ES1 is connected to an evaporator-mixer EM1, and likewise the diluate storage tank Sd. When an unmet heat need arises, it is only necessary to start the evaporator-mixer EM1 by supplying it with brine from the tank Sc to which it is connected and by diluting from the tank Sd with which it is associated, as described for example in FIG. 1.

In this way, an amount of heat Q0 can be "pumped" into a low-level source, for example at 20° C., and "raised" to be released at 55° C., in order for example to heat the primary heating water from 20° C. to 50° C. The same thing can be done in the second exchanger-mixer EM2 supplied from the evaporator-separator ES2, and the same thing can be done with the evaporator-mixer EM3 supplied from the evaporator-separator ES3.

Of course—and this is an important advantage of the invention—it is possible to operate either simultaneously or not and independently of one another the boiler and each of the evaporator-mixers EM1, EM2, and EM3. Thus, it is possible to store in the form of brine very considerable amounts of heat (depending on the volume of the storage tanks). Furthermore, it can be said that in continuous operation the installation's heating power, in the example illustrated, has been multiplied by four, the installation allowing a continuous output of a quantity of heat equal to 4Q0 at 50° C. from a quantity of heat equal to Q0 released at 1200° C.

The installation therefore assures a considerable utilization of the noble thermal energy by taking advantage of the energy's dissipation in greater proportions and with simpler implementing systems than do the solutions recommended to date.

Figure 21:
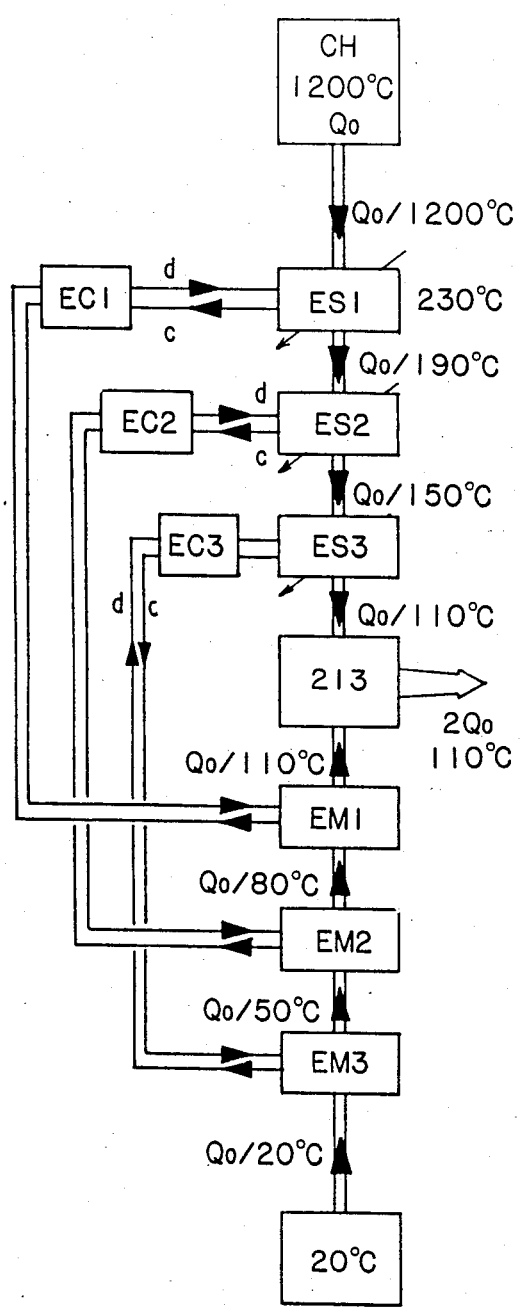
FIG. 21 is a diagram similar to that in FIG. 20 but illustrating another grouping of the evaporator-separators and the evaporator-mixers, usable in particular in the case of supplying a primary fluid at a relatively high temperature.

We shall now refer to FIG. 21, in which another operating diagram has been shown for a boiler CH intended to supply in the example illustrated vapor at 110° C. produced in an evaporator 213.

As in the previously given example, the boiler CH does not directly heat the evaporator 213, but rather indirectly through three evaporator-separators ES1, ES2 and ES3 mounted serially, in which the temperature dissipates successively from 230° to 190° C., from 190° to 150° C., and from 150° to 110° C. Of course, the pressures in these evaporator-separators and the nature and concentration of the solutions are determined so as to have the required conditions of operational equilibrium, as described above.

Thus through the three evaporators ES1, ES2, and ES3 an amount of heat equal to Q0 released at 110° C. is collected in the evaporator 213.

Each of the evaporator-separators ES1, ES2, and ES3 also makes it possible to prepare concentrated solutions in a manner analogous to that described above from diluted solutions, which solutions are supplied to evaporator-mixers EM1, EM2 and EM3. Naturally, as in the mode of realization illustrated in FIG. 20, it is possible and advantageous to provide storage tanks for such diluted solutions d and concentrated solutions c so as to give greater flexibility to the installation and not make use of reserve energy stored as brine to operate the evaporator-mixers except when needed. In order not to encumber the figure, these storage tanks have not been shown.

Assuming that there is a low-level energy source at 20° C. available, it is possible to raise the temperature of the amount of heat Q0 taken at 20° C. from the cold source to release it at 110° C. in the evaporator 213 by operating the three evaporator-mixers EM3, EM2 and EM1 serially, as explained in particular in relation to FIGS. 3 and 4 and by selecting the appropriate concentrated and diluted solutions. Thus in the evaporator 213 a power 2Q0 (i.e., twice that released in the boiler CH) is collected (when the installation is operating continuously).

At this point in the description, it is worthwhile to compare the installation described in FIG. 17 and the installations described in FIGS. 20 and 21.

Comparison of these figures shows that in FIG. 17 four evaporator-separators were used, connected in parallel (heated under the hypothesis described by solar radiation) intended to supply four serially connected evaporator-mixers. In FIG. 21, there are three evaporator-separators mounted serially supplying three evaporator-mixers mounted serially. In FIG. 20, there are three evaporator-separators mounted serially supplying three evaporator-mixers mounted in parallel.

In fact, it is clear according to the invention that it is possible to group the evaporator-separators of one installation and the evaporator-mixers of the same installation either serially, in parallel, or in a combined serial-parallel assembly, allowing greater flexibility in the installation's operation. It will in particular be noted that it is possible to operate certain evaporator-separators and certain evaporator-mixers with solutions of one given type and other evaporator-separators as well as other evaporator-mixers with other solutions adapted to the operating temperature levels of these devices.

We shall now refer to FIG. 22 in which a realization of a simplified installation will be described.

This installation includes a boiler CH in which is burned, for example, fuel oil or gas at 1200°-1500° C. The wall 214 of the boiler, which is in contact with the evaporation wall 215 of the evaporator-separator ES, is brought to a temperature in the neighborhood of 150° to 160° C. Onto the wall 215 of the evaporator-separator is brought the diluted solution d which is reconcentrated, the concentrated solution flowing to the base of the evaporator-separator while being brought to a temperature of around 150° C. The condensation wall 216 of the evaporator-separator ES is cooled while in contact with the wall 217 of the heat exchanger 218 in which occurs the heating of the primary fluid to be heated, consisting for example of water introduced at 20° C. into the exchanger 218. In the example illustrated, it has been assumed that the water came out at a temperature of 70° C., which means that the condensation wall 216 of the evaporator-separator ES is at an average temperature of 75° C. With the lithium bromide solutions mentioned, the vapor pressure in the evaporator-separator ES is on the order of 500 mm of mercury.

In this way, the heat Q0 released at 1200° C. in the combustion chamber of the boiler CH passes through the evaporator ES in which occurs the reconcentration of the diluted solutions d into concentrated solutions c and is released at 70° C. in the primary fluid heating chamber 218.

The concentrated solution c produced in the evaporator-separator ES is brought to the top of the evaporator-mixer EM in contact with the "hot" wall 219 of the evaporator-mixer, here assumed to have been brought to an average temperature of around 75° C. This concentrated solution absorbs the water vapor evaporated on the "cold" surface 220 of the evaporator-mixer, which evaporation assures the transfer of the energy taken from the cold source, which in the example illustrated is assumed to consist of water 221 brought to 20° C. Under these use conditions and with the solutions contemplated, the vapor pressure in the evaporator-mixer EM is around 15 mm of mercury. Passing through the evaporator-mixer lowers the temperature of the cold source by about 5° C., the water entering at 20° and exiting at 15° C.

The installation is completed by a counter-flow heat exchanger 222 which recovers part of the heat from the concentrated solution exiting at 150° C. from the evaporator-separator to bring it at 85° C. to the top of the evaporator-mixer, in exchange for the diluted solution d exiting from the exchanger-mixer at a temperature of 75° C. to bring it to the top of the evaporator-separator at 140° C. Circulation pumps such as 223, 224 complete the installation. By this arrangement the calorific heating power of the installation is essentially doubled, the noble energy's dissipation being put to advantage to allow extraction of energy in essentially equivalent amounts drawn from a low-level temperature source.

A heat recuperator 225 placed on the fumes circuit advantageously completes the installation.

In order to simplify construction and limit heat losses, all the systems described above can be built and assembled concentrically around the combustion chamber CH. Such a grouping also makes it possible to get a very compact and simple construction, as illustrated diagrammatically in FIG. 23.

In this figure, we find the combustion chamber CH surrounded by the evaporator-separator ES, the chamber 218 in which the primary fluid is heated, the evaporator-mixer EM, and finally the peripheral chamber 221 in which circulates the water forming the low-level cold source from which is drawn the heat made reutilizable by such an installation according to the principles described above.

Figure 23:
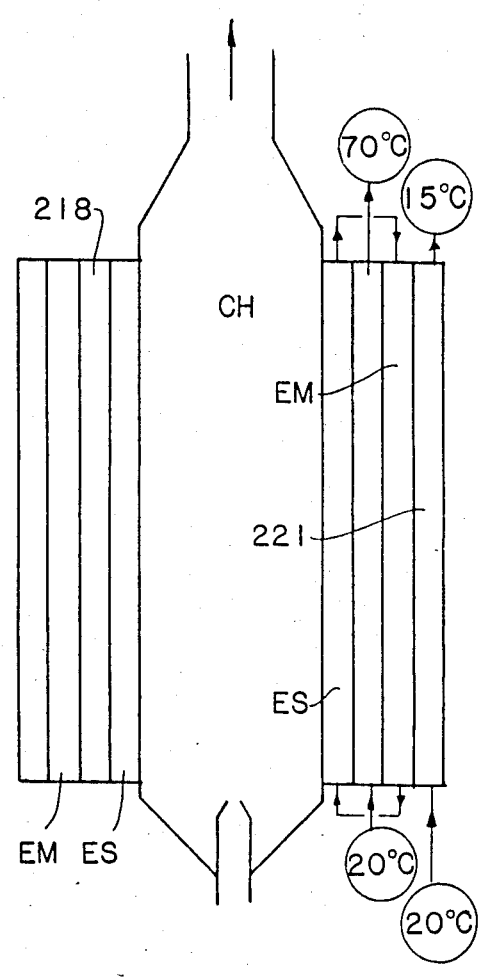
FIG. 23 shows diagrammatically in section another compact installation utilizing a cylindrical-circular construction.
Figure 22:
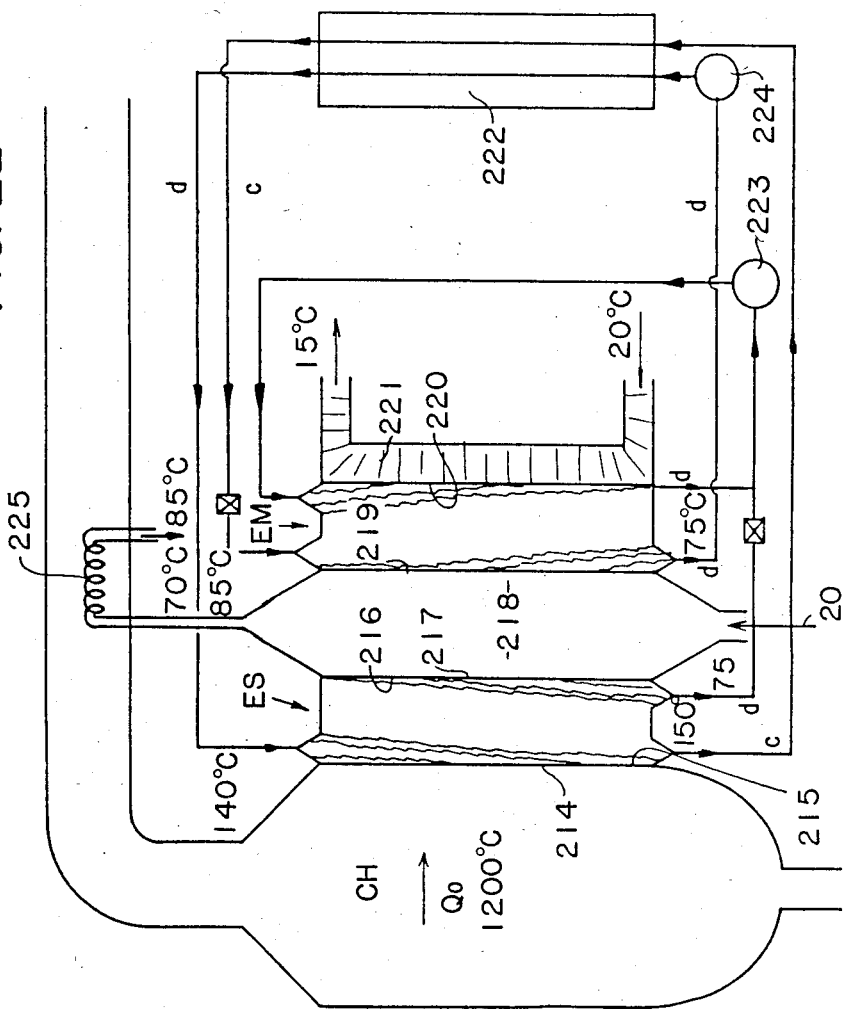
FIG. 22 is a diagrammatic sectional view illustrating a compact installation for the production of hot water, essentially utilizing a boiler, an evaporator-separator and an evaporator-mixer.

In FIG. 23, the figures corresponding to the example given in FIG. 22 have been indicated, the chamber 218 being heated on one side by the "cold" wall of the evaporator-separator ES and on the other side by the "hot" wall of the evaporator-mixer EM.

Finally, it will be noted that the effective heat outputs received will in practice be slightly lower than the expected theoretical outputs given above, this because not all the devices are completely reversible. Thus, for example, an installation such as that diagrammed in FIG. 20 will make it possible to collect continuously an amount of heat essentially equal to 3 Qo instead of the theoretical 4 Qo; likewise in FIG. 21, it will be possible to extract about 1.7 Qo instead of 2 Qo, with industrially current devices of simple mechanical constructions.

Furthermore, it is clear that many variants of form and appearance in the exchangers, as well as conditions of utilization, can be imagined, particularly in the distribution of the solvent and brine. For example, in the diagrams of FIGS. 13 and 15, the pumps 92 and 95 may be omitted, with the flow of the liquids in the corresponding branches of the circuits occurring by simple pressure differences in the chambers of the evaporator-separators and the evaporator-mixers.

In addition, many fluids other than water, or even mixtures of fluids, can be utilized as "solvents." For low-temperature uses (0° C. and below), a fluid more volatile than water will be selected, for example ammonia, an alcohol, etc. For high-temperature uses (200° C. and above), a fluid less volatile than water will be used, for example a volatile metal such as mercury, cadmium, sodium.

It should be understood that the invention is not limited to the exact details of contruction shown and described herein for obvious modifications will occur to persons skilled in the art.

I claim:

1. A system for producing heat at a desired temperature, the system comprising:
    a boiler having a heated external wall;
    at least one evaporator-separator device having a surface contiguous to said heated external wall of said boiler for producing a concentrated solution from a diluted solution; and
    at least one evaporator-mixer, using said concentrated solution produced by said evaporator-separator and a source of heat at a lower temperature, for producing heat at said desired temperature, the evaporator-mixed including:
a first wall for conducting heat therethrough;
a first liquid consituting said source of heat at the lower temperature flowing adjacent a first surface of the first wall;
a second liquid flowing across a second surface of the first wall for absorbing heat transferred through the first wall, from the first liquid and causing evaporation of the second liquid;
a second wall located in spaced confronting relation to the first wall;
a third liquid, constituted by said concentrated solution produced by said evaporator-separator, flowing across a surface of the second wall which confronts the first wall and upon which the evaporated second liquid condenses thereby mixing with the third liquid and elevating the temperature thereof above that of the first liquid; and
a fourth liquid flowing across an opposite surface of the second wall and collecting heat transferred therethrough for elevating the temperature of the fourth liquid to said desired temperature level higher than the first liquid;
a heat exchange means between said fourth liquid to be heated at said desired temperature and at least some of the concentrated and diluted solutions treated in said evaporator-separator device;
said third liquid in mixture with said evaporated liquid having condensed upon said surface of the second wall confronting the first wall, forming said diluted solution at the bottom of said surface.

2. A system for producing heat at a desired temperature, the system comprising:
a boiler having a heated external wall;
a plurality of evaporator-separators having surfaces contiguous to said heated external wall of said boiler for producing a concentrated solution from a diluted solution, the plurality of evaporator-separators being serially cascaded and wherein the temperature of the evaporator-separators decrease progressively from the first stage to the last stage; and
at least one evaporator-mixer, using said concentrated solution produced by said evaporator-separator and a source of heat at a lower temperature, for producing heat at said desired temperature, the evaporator-mixer including:
a first wall for conducting heat therethrough;
a first liquid constituting said source of heat at the lower temperature flowing adjacent a first surface of the first wall;
a second liquid flowing across a second surface of the first wall for absorbing heat transferred through the first wall, from the first liquid and causing evaporation of the second liquid;
a second wall located in spaced confronting relation to the first wall;
a third liquid, constituted by said concentrated solution produced by said evaporator-separator, flowing across a surface of the second wall which confronts the first wall and upon which the evaporated second liquid condenses thereby mixing with the third liquid and elevating the temperature thereof above that of the first liquid; and
a fourth liquid flowing across an opposite surface of the second wall and collecting heat transferred therethrough for elevating the temperature of the fourth liquid to said desired temperature level higher than the first liquid;
said third liquid in mixture with said evaporated liquid having condensed upon said surface of the second wall confronting the first wall, forming said diluted solution at the bottom of said surface.

3. A system according to claim 2 wherein said fourth liquid to be heated at the desired temperature is in contact, through an exchange wall, with the lower temperature concentrated solution produced in the last evaporator-separator stage and through another exchange wall with the diluted solution produced in the evaporator-mixer.

4. A system according to claim 3, wherein said boiler is placed in the center of the system and is surrounded over most of its surface by the first evaporator stage with which it is in thermal exchange, said fourth fluid to be heated surrounds the last evaporator-separator stage with which it is in thermal exchange, and the evaporator-mixer surrounds, by its said second wall, said fourth fluid with which it is in thermal exchange, while said first wall of said evaporator-mixer is surrounded by the fluid from the low temperature thermal source with which it is in thermal exchange.

5. A system according to claim 4, wherein the construction is generally cylindrical.

* * * * *